United States Patent
Asuke et al.

(10) Patent No.: US 8,111,053 B2
(45) Date of Patent: Feb. 7, 2012

(54) DC-DC CONVERTER

(75) Inventors: Hideki Asuke, Niiza (JP); Hideharu Takano, Niiza (JP); Mamoru Tsuruya, Niiza (JP); Masashi Ochiai, Niiza (JP); Masayoshi Yamamoto, Matsue (JP); Takahiro Kawashima, Matsue (JP); Shigeyuki Funabiki, Matsue (JP)

(73) Assignees: Sanken Electric Co., Ltd., Niiza-shi (JP); Shimane University, Matsue-shi (JP)

( * ) Notice: Subject to any disclaimer, the term of this patent is extended or adjusted under 35 U.S.C. 154(b) by 866 days.

(21) Appl. No.: 12/179,036

(22) Filed: Jul. 24, 2008

(65) Prior Publication Data

US 2010/0019743 A1  Jan. 28, 2010

(51) Int. Cl.
- G05F 1/24 (2006.01)
- G05F 3/16 (2006.01)
- G05F 1/12 (2006.01)
- G05F 1/253 (2006.01)

(52) U.S. Cl. ......... 323/261; 323/225; 323/247; 323/262

(58) Field of Classification Search .................. 323/222, 323/225, 247, 259, 261–262, 272, 285, 328, 323/332, 344, 345
See application file for complete search history.

(56) References Cited

U.S. PATENT DOCUMENTS

| | | | | |
|---|---|---|---|---|
| 7,138,787 B2 * | 11/2006 | Tsuruya | ........................ | 323/225 |
| 7,233,507 B2 * | 6/2007 | Schenk | ........................ | 363/50 |
| 7,265,650 B2 * | 9/2007 | Jang et al. | ........................ | 336/212 |
| 7,276,884 B2 * | 10/2007 | Tsuruya | ........................ | 323/261 |
| 2004/0113596 A1 | 6/2004 | Peron | | |
| 2008/0049475 A1 * | 2/2008 | Watanabe et al. | ........................ | 363/127 |

FOREIGN PATENT DOCUMENTS

| | | |
|---|---|---|
| EP | 0 351 144 A1 | 1/1990 |
| JP | 9-266665 | 10/1997 |
| JP | 2006-262601 | 9/2006 |
| WO | WO 2004/095682 A1 | 4/2004 |

OTHER PUBLICATIONS

U.S. Appl. No. 12/250,839, filed Oct. 14, 2008, Asuke et al.
U.S. Appl. No. 12/250,843, filed Oct. 14, 2008, Asuke et al.
U.S. Appl. No. 12/999,932, filed Dec. 17, 2010, Asuke et al.

* cited by examiner

*Primary Examiner* — Adolf Berhane
*Assistant Examiner* — Jeffrey Gblende
(74) *Attorney, Agent, or Firm* — Oblon, Spivak, McClelland, Maier & Neustadt, L.L.P.

(57) ABSTRACT

The present invention provides a DC-DC converter including a first series circuit connected to both ends of a first switch and formed of a winding of a first transformer, a first reactor, a first diode, and a smoothing capacitor, a second diode connected to a connection point of a primary winding of the first transformer, the winding of the first transformer and the first switch, and to one end of the smoothing capacitor, a second series circuit connected to both ends of a second switch and formed of a winding of a second transformer, a second reactor, a third diode, and the smoothing capacitor, a fourth diode connected to a connection point of a primary winding of the second transformer, the winding of the second transformer and the second switch, and to the one end of the smoothing capacitor, a third reactor connected to both ends of a series circuit of a secondary winding of the first transformer and a secondary winding of the second transformer, and a control circuit which alternately turns on the first switch and the second switch every ½ cycle, turns off the first switch during an on-period of the second switch, and turns off the second switch during an on-period of the first switch.

1 Claim, 6 Drawing Sheets

DC-DC CONVERTER

BACKGROUND OF THE INVENTION

1. Field of the Invention

The present invention relates to a DC-DC converter formed of a boost chopper circuit, and particularly relates to a DC-DC converter employed in an electric automobile.

2. Description of the Prior Art

FIG. 1 is a circuit configuration diagram of a conventional DC-DC converter. The DC-DC converter is described in Japanese Patent Application Publication No. 2006-262601. The boost DC-DC converter has a direct current power supply Vdc1, transformers T3 and T4, a reactor L3, switches Q1 and Q2, diodes D3 and D4, a smoothing capacitor C1, and a control circuit 100.

The transformer T3 has a primary winding 5a (with np turns), an additional winding 5b (with np1 turns) connected to the primary winding 5a in series, and a secondary winding 5c (with ns turns) electromagnetically coupled to the primary winding 5a and the additional winding 5b. The transformer T4 is configured to be identical to the transformer T3, and has a primary winding 6a (with np turns), a winding 6b (with np1 turns) connected to the primary winding 6a in series, and a secondary winding 6c (with ns turns) electromagnetically coupled to the primary winding 6a and the winding 6b.

The drain and source of the switch Q1 formed of a MOSFET or the like is connected respectively to both ends of the direct current power supply Vdc1 via the primary winding 5a of the transformer T3. The drain and source of the switch Q2 formed of a MOSFET or the like is connected respectively to both ends of the direct current power supply Vdc1 via the primary winding 6a of the transformer T4. A first series circuit is formed of the additional winding 5b of the transformer T3, the diode D3, and the smoothing capacitor C1. The first series circuit is connected to the connection point of the primary winding 5a of the transformer T3 and the drain of the switch Q1 and to the source of the switch Q1. A second series circuit is formed of the winding 6b of the transformer T4, the diode D4, and the smoothing capacitor C1. The second series circuit is connected to the connection point of the primary winding 6a of the transformer T4 and the drain of the switch Q2 and to the source of the switch Q2.

The reactor L3 is connected to both ends of a series circuit of the secondary winding 5c of the transformer T3 and the secondary winding 6c of the transformer T4. The control circuit 100 turns on/off the switch Q1 and the switch Q2 with a phase difference of 180° based on an output voltage Vo of the smoothing capacitor C1.

In the conventional DC-DC converter configured in this manner, when the switch Q1 is turned on by a Q1 control signal Q1g from the control circuit 100, the current flows from the plus side of the direct current power supply Vdc1, to the primary winding 5a, to the switch Q1, and then to the minus side of the direct current power supply Vdc1. Therefore, a current Q1i of the switch Q1 increases linearly. Simultaneously, voltage also occurs in the secondary winding 5c of the transformer T3, and a current L3i flows from the secondary winding 5c, to the reactor L3, to the secondary winding 6c, and then to the secondary winding 5c.

The current L3i flows according to the law of equal ampere-turns of the transformer. Here, energy is accumulated in the reactor L3, and the same current flows also in the secondary winding 6c of the transformer T4. Therefore, voltages are induced in accordance with the number of turns in the primary winding 6a and the winding 6b of the transformer T4.

When a turn ratio in the transformer T4 is A=(np+np1)/np, a current of 1/A of the current Q1i of the switch Q1 flows from the plus side of the direct current power supply Vdc1, to the primary winding 6a, to the winding 6b, to the diode D4, to the smoothing capacitor C1, and then to the minus side of the direct current power supply Vdc1, thereby flowing in the diode D4. A current D4i of the diode D4 flows until a time at which the switch Q2 is turned on. The output voltage Vo of the smoothing capacitor C1 is a sum of the voltage of the direct current power supply Vdc1 (input voltage), the voltage generated in the primary winding 6a of the transformer T4, and the voltage generated in the winding 6b of the transformer T4.

When the duty cycle of the switch Q1 is D (D=Ton/T), the voltage generated in the transformer T4 equals A·Vdc1·D. Ton indicates the time for which the switch Q1 is turned on. T indicates the switching cycle of the switch Q1. The output voltage Vo of the smoothing capacitor C1 is expressed by Vo=Vdc1 (1+A·D), and the output voltage Vo can be controlled by varying the duty cycle D.

Next, the switch Q1 is turned off by the Q1 control signal Q1g from the control circuit 100. At this time, a current D3i flows from the plus side of the direct current power supply Vdc1, to the primary winding 5a, to the additional winding 5b, to the diode D3, to the smoothing capacitor C1, and then to the minus side of the direct current power supply Vdc1.

Next, the switch Q2 is turned on by a Q2 control signal Q2g from the control circuit 100. At this time, the current flows from the plus side of the direct current power supply Vdc1, to the primary winding 6a, to the switch Q2, and then to the minus side of the direct current power supply Vdc1. Therefore, a current Q2i of the switch Q2 increases linearly. Simultaneously, voltage also occurs in the secondary winding 6c of the transformer T4, and the current L3i flows within the reactor L3 from the secondary winding 6c, to the secondary winding 5c, to the reactor L3, and then to the secondary winding 6c while increasing.

The current L3i flows according to the law of equal ampere-turns of the transformer and the like. Here, energy is accumulated in the reactor L3, and the same current flows also in the secondary winding 5c of the transformer T3. Therefore, voltages are induced in accordance with the number of turns in the primary winding 5a and the additional winding 5b of the transformer T3.

When the turn ratio in the transformer T3 is A=(np+np1)/np, the current Q2i of the switch Q2 which is 1/A flows from the plus side of the direct current power supply Vdc1, to the primary winding 5a, to the additional winding 5b, to the diode D3, to the smoothing capacitor C1, and then to the minus side of the direct current power supply Vdc1, thereby flowing in the diode D3. The current D3i of the diode D3 flows until a time at which the switch Q1 is turned on. The output voltage Vo of the smoothing capacitor C1 is a sum of the voltage of the direct current power supply Vdc1 (input voltage), the voltage generated in the primary winding 5a of the transformer T3, and the voltage generated in the additional winding 5b of the transformer T3.

In this manner, in the multiphase boost chopper circuit with transformers shown in FIG. 1, two independent phases are combined by transformers. With such configuration, only one core is necessary instead of two cores, and a boost operation can be performed by the one core.

However, in the DC-DC converter shown in FIG. 1, recovery losses occur in the diodes D3 and D4. Also, switching losses occur when the switches Q1 and Q2 are turned on.

SUMMARY OF THE INVENTION

An object of the present invention is to provide a DC-DC converter which can suppress a recovery loss of a diode and a switching loss when a switch is turned on.

A first aspect of the present invention provides a DC-DC converter which increases a voltage of a direct current power supply, the DC-DC converter comprising a first switch connected to both ends of the direct current power supply via a primary winding of a first transformer, a second switch connected to both ends of the direct current power supply via a primary winding of a second transformer, a first series circuit which is connected to both ends of the first switch and which is formed of an additional winding of the first transformer connected to the primary winding of the first transformer in series, a first reactor, a first diode, and a smoothing capacitor, a second diode connected to a connection point of the primary winding of the first transformer, the additional winding of the first transformer, and the first switch and to one end of the smoothing capacitor, a second series circuit which is connected to both ends of the second switch and which is formed of an additional winding of the second transformer connected to the primary winding of the second transformer in series, a second reactor, a third diode, and the smoothing capacitor, a fourth diode connected to a connection point of the primary winding of the second transformer, the additional winding of the second transformer and the second switch, and to one end of the smoothing capacitor, a third reactor connected to both ends of a series circuit in which a secondary winding of the first transformer and a secondary winding of the second transformer are connected in series, and a control circuit which alternately turns on the first switch and the second switch alternately every ½ cycle, turns off the first switch during an on-period of the second switch, and turns off the second switch during an on-period of the first switch.

According to the present invention, the first reactor is connected between the first diode and the winding of the first transformer, and the second reactor is connected between the third diode and the winding of the second transformer. Accordingly, the decrease of current when the first, second, third, and fourth diodes are turned off becomes moderate, and recovery losses of the diodes can be suppressed. Moreover, the increase of current when the first and second switches are turned on also becomes moderate, and switching losses can be suppressed.

BRIEF DESCRIPTION OF THE DRAWINGS

FIG. 7 is a diagram showing waveforms of the voltage and the current when a switch Q1 of the conventional DC-DC converter is turned on.

FIG. 8 is a diagram showing waveforms of the voltage and the current when a switch Tr1 of the DC-DC converter of Embodiment 1 is turned on.

DETAILED DESCRIPTION OF THE PREFERRED EMBODIMENTS

An embodiment of a DC-DC converter of the present invention will be described below in detail with reference to the drawings.

Embodiment 1

Figure 1:
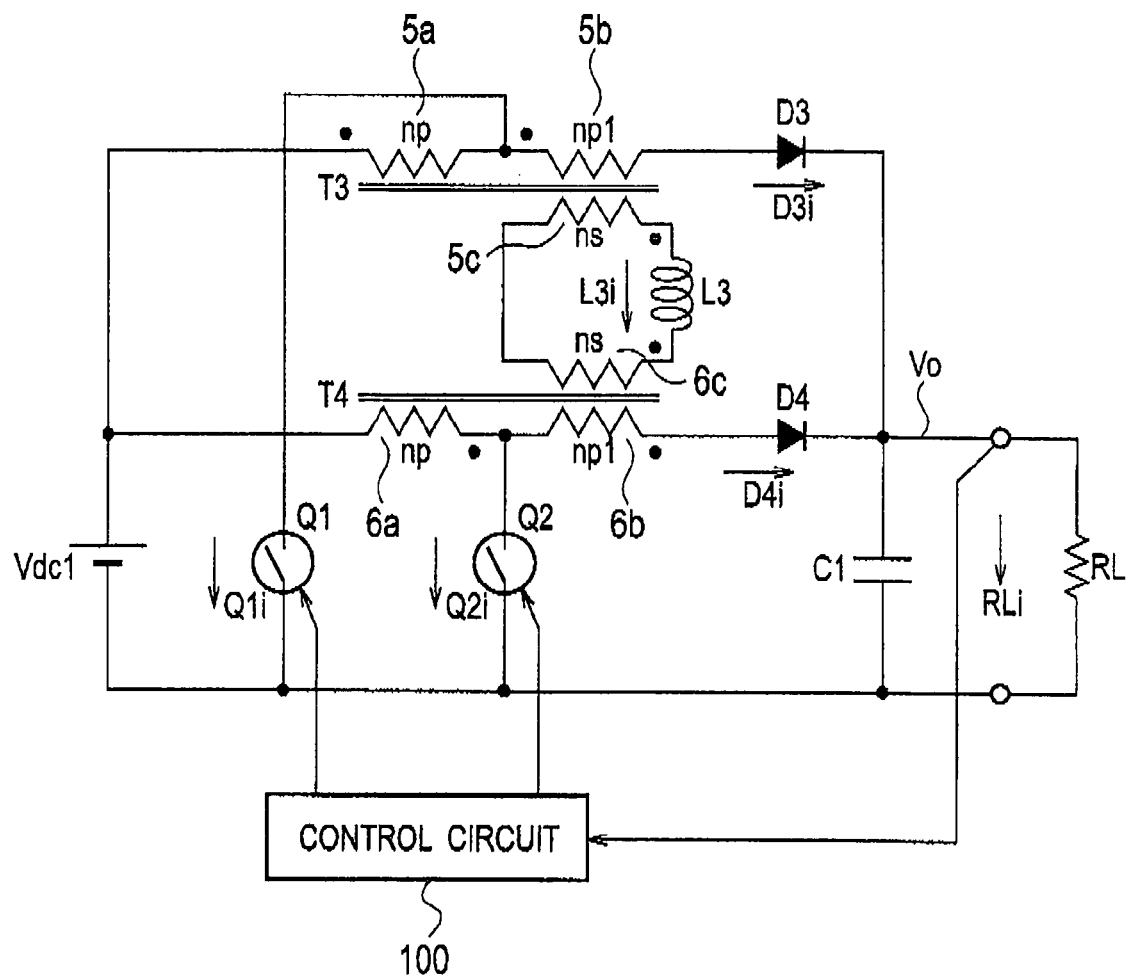
FIG. 1 is a circuit configuration diagram of a conventional DC-DC converter.
Figure 2:
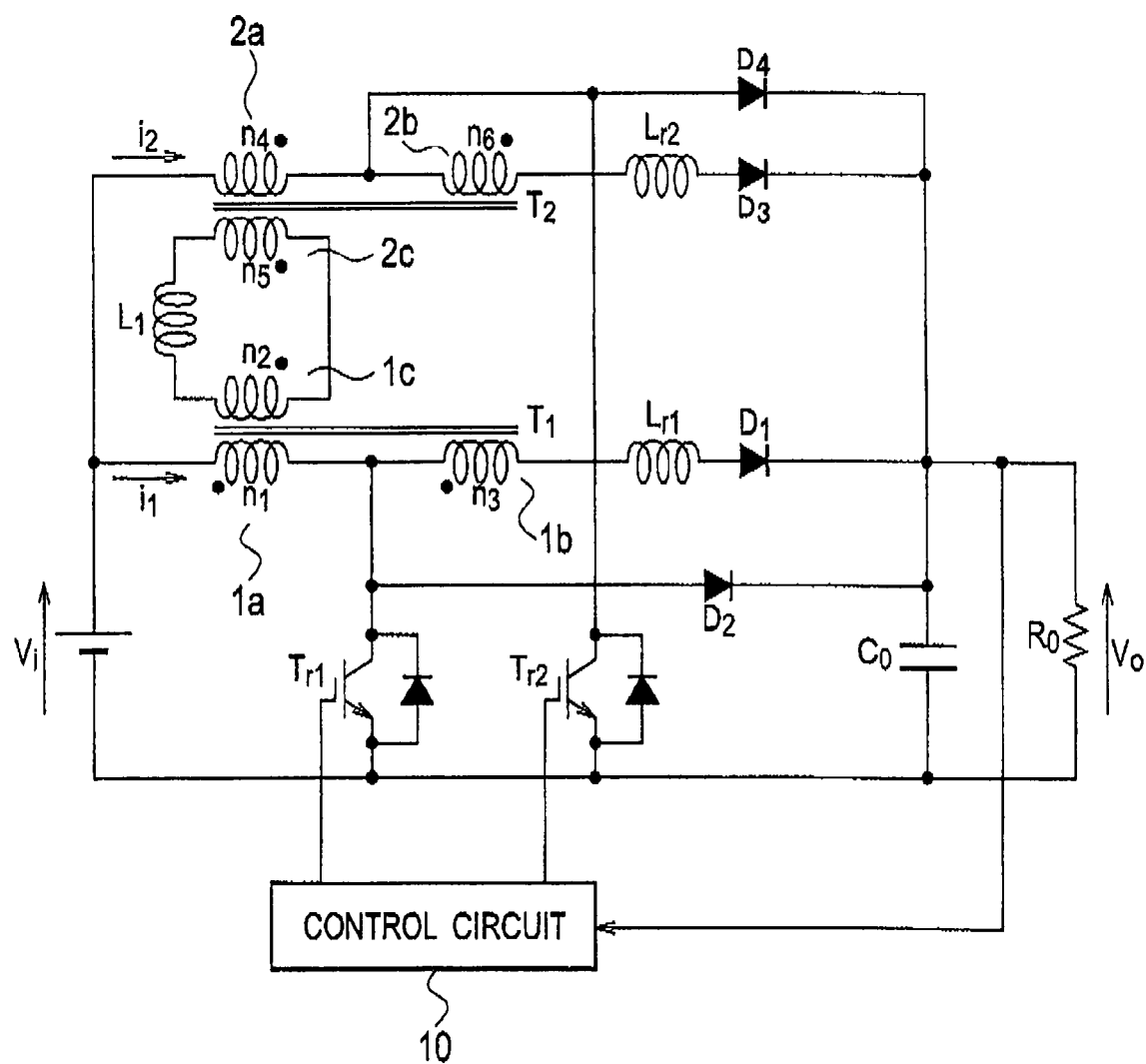
FIG. 2 is a circuit configuration diagram of a DC-DC converter of Embodiment 1.

FIG. 2 is a circuit configuration diagram showing a DC-DC converter of Embodiment 1. The DC-DC converter shown in FIG. 2 is a multiphase boost chopper circuit with transformer.

The DC-DC converter has a direct current power supply Vi, a transformer T1 (first transformer), a transformer T2 (second transformer), a reactor Lr1 (first reactor), a reactor Lr2 (second reactor), a reactor L1 (third reactor), a switch Tr1 (first switch), a switch Tr2 (second switch), diodes D1, D2, D3, and D4, a smoothing capacitor Co, and a control circuit 10.

The transformer T1 has a primary winding 1a (with n1 turns), an additional winding 1b (with n3 turns) connected to the primary winding 1a in series, and a secondary winding 1c (with n2 turns) which is electromagnetically coupled to the primary winding 1a. The transformer T2 is configured to be identical to the transformer T1, and has a primary winding 2a (with n4 turns), an additional winding 2b (with n6 turns) connected to the primary winding 2a in series, and a secondary winding 2c (with n5 turns) which is electromagnetically coupled to the primary winding 2a.

The collector and emitter of the switch Tr1 formed of an insulated-gate bipolar transistor (IGBT) are connected respectively to both ends of the direct current power supply Vi via the primary winding 1a of the transformer T1. The collector and emitter of the switch Tr2 formed of an IGBT are connected both ends of the direct current power supply Vi via the primary winding 2a of the transformer T2.

A first series circuit formed of the additional winding 1b of the transformer T1, the reactor Lr1, the diode D1, and the smoothing capacitor Co is connected to both ends of the switch Tr1. A second series circuit formed of the additional winding 2b of the transformer T2, the reactor Lr2, the diode D3, and the smoothing capacitor Co is connected to both ends of the switch Tr2.

The diode D2 is connected between the connection point of the primary winding 1a of the transformer T1, the additional winding 1b of the transformer T1, and the switch Tr1, and one end of the smoothing capacitor Co. The diode D4 is connected between the connection point of the primary winding 2a of the transformer T2, the additional winding 2b of the transformer T2, and the switch Tr2, and one end of the smoothing capacitor Co.

The reactor L1 is connected to both ends of a series circuit in which the secondary winding 1c of the transformer T1 and the secondary winding 2c of the transformer T2 are connected in series. The control circuit 10 turns off the switch Tr1 during an on-period of the switch Tr2 and turns off the switch Tr2 during an on-period of the switch Tr1 based on an output voltage Vo of the smoothing capacitor Co. That is, there is an overlapping period, in which the switch Tr1 and the switch Tr2 are simultaneously turned on, for every ½ cycle.

A first converter is configured of the transformer T1, the reactor Lr1, the diode D1, the diode D2, and the switch Tr1. A second converter is configured of the transformer T2, the reactor Lr2, the diode D3, the diode D4, and the switch Tr2.

Next, the operation of the DC-DC converter of Embodiment 1 configured in this manner will be described with reference to a timing diagram shown in FIG. 3.

Figure 3:
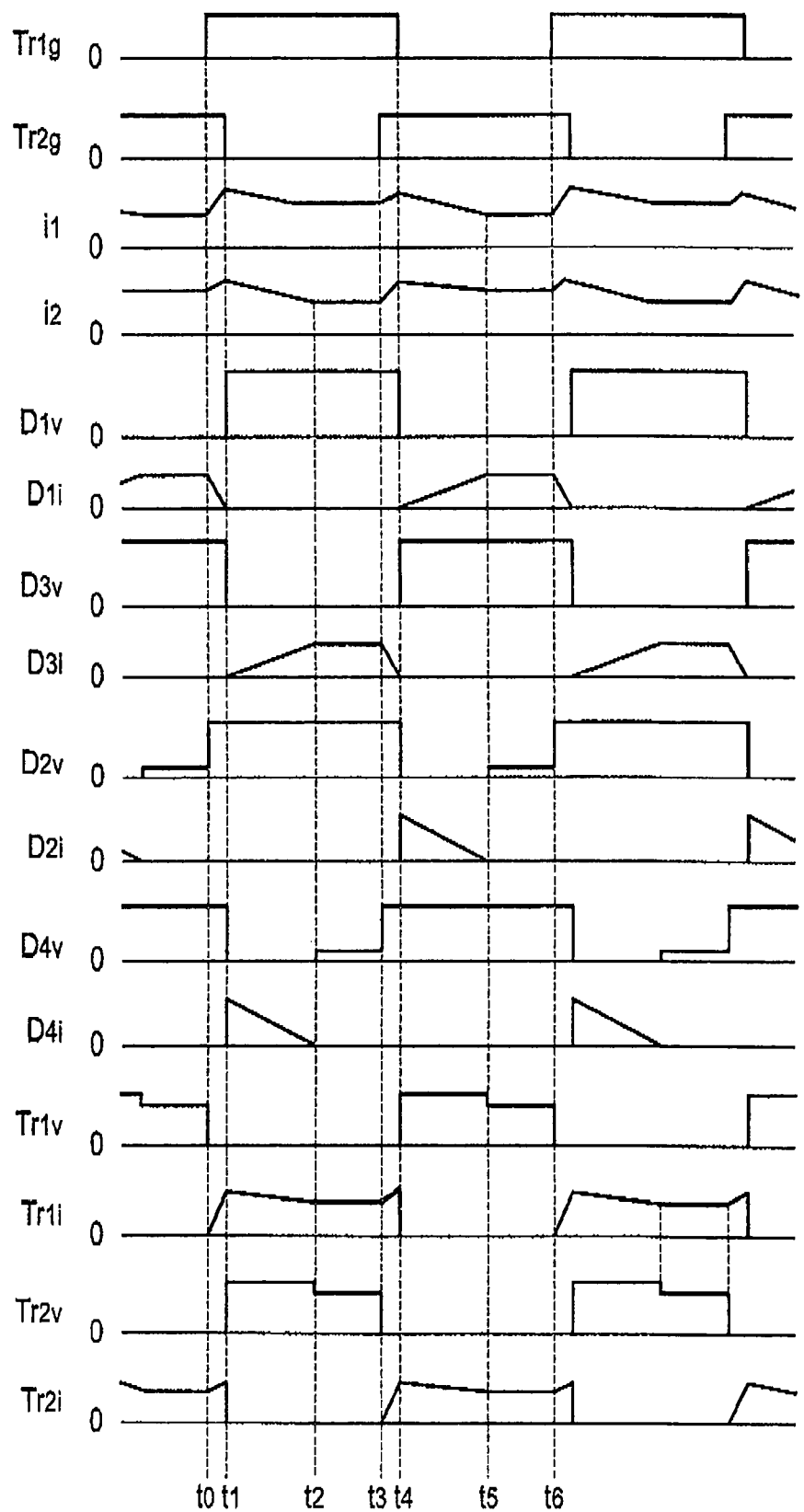
FIG. 3 is a timing diagram of each of sections of the DC-DC converter of Embodiment 1.

Note that, in FIG. 3, time t0 to t3 is a ½ cycle, and time t0 to t1 and time t3 to t4 are the overlapping periods in which the switch Tr1 and the switch Tr2 are simultaneously turned on.

First, at time t0, the switch Tr1 is turned on by a gate signal Tr1g of the switch Tr1 from the control circuit 10. At this time, the current flows from the plus side of the direct current power supply Vi, to the primary winding 1a, to the switch Tr1, and then to the minus side of the direct current power supply Vi. Therefore, a current i1 flowing in the primary winding 1a of the transformer T1 increases. Simultaneously, voltage also occurs in the secondary winding 1c of the transformer T1, and a current L1i flows from the secondary winding 1c, to the secondary winding 2c, to the reactor L1, and then to the secondary winding 1c, thereby flowing in the reactor L1.

The current L1i flows according to the law of equal ampere-turns of the transformer and the like. Here, energy is accumulated in the reactor L1, and the same current flows also in the secondary winding 2c of the transformer T2. Therefore, voltages are induced in accordance with the number of turns in the primary winding 2a and the additional winding 2b of the transformer T2.

When a turn ratio in the transformer T2 is $A=(n4+n6)/n4$, a current of $1/A$ of the current of the switch Tr1 flows from the plus side of the direct current power supply Vi, to the primary winding 2a, to the winding 2b, to the reactor Lr2, to the diode D3, to the smoothing capacitor Co, and then to the minus side of the direct current power supply Vdc1, thereby flowing in the diode D3. A current D3i of the diode D3 flows from time t1 to time t3 at which the switch Tr2 is turned on. The output voltage Vo of the smoothing capacitor Co is a sum of the voltage of the direct current power supply Vi (input voltage), the voltage generated in the primary winding 2a of the transformer T2, and the voltage generated in the winding 2b of the transformer T2.

When the duty cycle of the switch Tr1 is D ($D=Ton/T$), the voltage generated in the transformer T2 equals $A \cdot Vi \cdot D$. Ton indicates the time for which the switch Tr1 is turned on. T indicates the switching cycle of the switch Tr1. The output voltage Vo of the smoothing capacitor Co is expressed by $Vo=Vi(1+A \cdot D)$. Therefore, the output voltage Vo can be controlled by varying the duty cycle D.

Next, at time t1, the switch Tr2 is turned off by a gate signal Tr2g from the control circuit 10, whereby a collector-emitter voltage Tr2v of the switch Tr2 increases. Accordingly, the current first flows from the plus side of the direct current power supply Vi, to the primary winding 2a, to the diode D4, to the smoothing capacitor Co, and then to the minus side of the direct current power supply Vi. Therefore, a current D4i flows in the diode D4.

However, the current flowing in the diode D4 is commutated to the diode D3 due to the voltage applied to the winding 2b of the transformer T2. Therefore, the current D3i flowing in the diode D3 increases. Accordingly, the current D4i of the diode D4 moderately decreases. When the currents of the primary winding 2a and the additional winding 2b of the transformer T2 have finished commutating to the diode D3, the diode D4 is turned off at time t2. Since the diode D4 is turned off after the current is moderately decreased, occurrence of a recovery loss in the diode D4 is suppressed.

During time t2 to t3, the transformer current is completely commutated to the diode D3, and the current is output only through the diode D3.

When the switch Tr2 is turned on by the gate signal Tr2g of the switch Tr2 from the control circuit 10 at time t3, the current of the primary winding 2a and the winding 2b of the transformer T2 starts commutating to the switch Tr2 from the diode D3.

At this time, the increase of current in the switch Tr2 is made moderate by the reactor Lr2, whereby a zero-current turn-on operation can be realized. Accordingly, the decrease of current in the diode D3 also becomes moderate, whereby occurrence of a recovery loss at the time of turn-off can be suppressed.

The current flows from the plus side of the direct current power supply Vi, to the primary winding 2a, to the switch Tr2, and then to the minus side of the direct current power supply Vi. Therefore, a current i2 flowing in the primary winding 2a of the transformer T2 increases. Simultaneously, voltage also occurs in the secondary winding 2c of the transformer T2, whereby the current L1i flows from the secondary winding 2c, to the reactor L1, to the secondary winding 1c, and then to the secondary winding 2c.

The current L1i flows according to the law of equal ampere-turns of the transformer and the like. Here, energy is accumulated in the reactor L1, and the same current flows also in the secondary winding 1c of the transformer T1. Therefore, voltages are induced in accordance with the number of turns in the primary winding 1a and the additional winding 1b of the transformer T1.

When the turn ratio in the transformer T1 is $A=(n1+n3)/n1$, a current of $1/A$ of the current of the switch Tr2 flows from the plus side of the direct current power supply Vi, to the primary winding 1a, to the additional winding 1b, to reactor Lr1, to the diode D1, to the smoothing capacitor Co, and then to the minus side of the direct current power supply Vi, thereby flowing in the diode D1. A current D1i of the diode D1 flows from time t4 until time t6 at which the switch Tr1 is turned on. The output voltage Vo of the smoothing capacitor Co is a sum of the voltage of the direct current power supply Vi (input voltage), the voltage generated in the primary winding 1a of the transformer T1, and the voltage generated in the additional winding 1b of the transformer T1.

When the duty cycle of the switch Tr2 is D ($D=Ton/T$), the voltage generated in the transformer T1 equals $A \cdot Vi \cdot D$. Ton indicates the time for which the switch Tr2 is turned on. T indicates the switching cycle of the switch Tr2. The output voltage Vo of the smoothing capacitor Co is expressed by $Vo=Vi(1+A \cdot D)$. Therefore, the output voltage Vo can be controlled by varying the duty cycle D.

Next, at time t4, the switch Tr1 is turned off by the gate signal Tr1g from the control circuit 10, whereby a collector-emitter voltage Tr1v of the switch Tr1 increases. Accordingly, the current first flows from the plus side of the direct current power supply Vi, to the primary winding 1a, to the diode D2, to the smoothing capacitor Co, and then to the minus side of the direct current power supply Vi. Therefore, a current D2i flows in the diode D2.

However, the current flowing in the diode D2 is commutated to the diode D1 due to the voltage applied to the additional winding 1b of the transformer T1. Therefore, the current D1i flowing in the diode D1 increases. Accordingly, the current D2i of the diode D2 moderately decreases. When the currents of the primary winding 1a and the additional winding 1b of the transformer T1 have finished commutating to the diode D1, the diode D2 is turned off at time t5. Since the diode D2 is turned off after the current is moderately decreased, occurrence of a recovery loss in the diode D2 is suppressed.

During time t5 to t6, the transformer current is completely commutated to the diode D1, and the current is output only through the diode D1.

When the switch Tr1 is turned on at time t6 (i.e., time t0), the current of the primary winding 1a and the additional winding 1b of the transformer T1 starts commutating to the switch Tr1 from the diode D1.

At this time, the increase of current in the switch Tr1 is made moderate by the reactor Lr1, and the zero-current turn-on operation can be achieved. Accordingly, the decrease of current in the diode D1 also becomes moderate, and occurrence of a recovery loss at the time of turn-off can be suppressed.

Note that the current i1 and the current i2 change in the following manner during the periods described above. Comparing the period in which the current flows in the switches Tr1 and Tr2 and the period in which the current flows in the diodes D1 and D2, the number of turns of the transformer winding in which the current flows changes. Since the magnetic flux in the core of the transformer is continuous, the amount of current changes gradually.

During the period in which the current flows in the switches Tr1 and Tr2, the current flows in only the windings 1a and 2a. Thus, the number of turns is small and more current is necessary in order to maintain the magnetic flux. Therefore, the currents i1 and i2 increase at this time.

In contrast, during the period in which the current flows in the diodes D1 and D3, the current flows in the winding 1a, 1b, 2a, and 2b. Thus, the number of windings in which the current flows increases. Therefore, current necessary for generating the same magnetic flux is small, and values of the currents i1 and i2 during this period decreases.

Regarding ripples of the currents i1 and i2, the currents increase when both of the switches Tr1 and Tr2 are turned on, and the currents decrease when one of the switches Tr1 and Tr2 is turned off.

Figure 4:
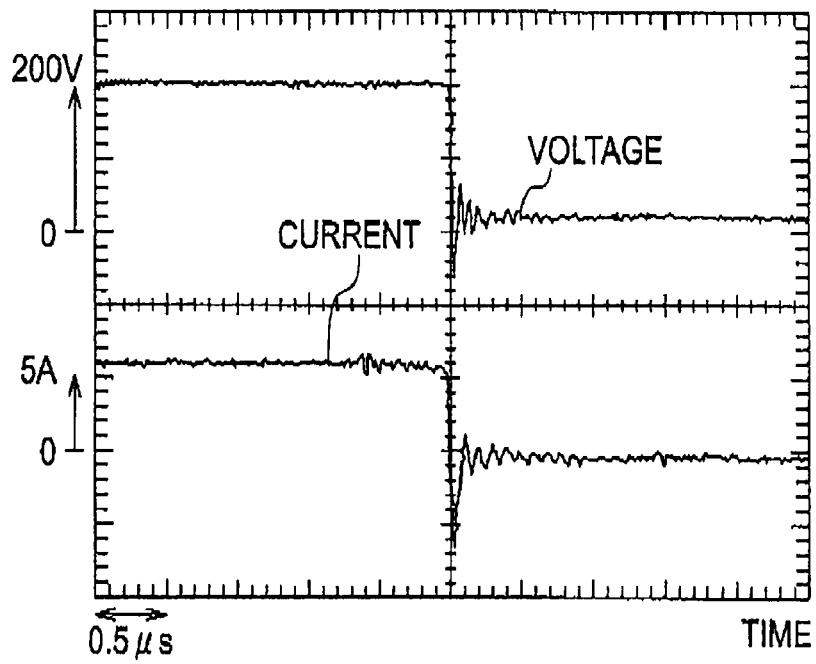
FIG. 4 is a diagram showing waveforms of the voltage and the current when a diode D3 of the conventional DC-DC converter is turned off.
Figure 5:
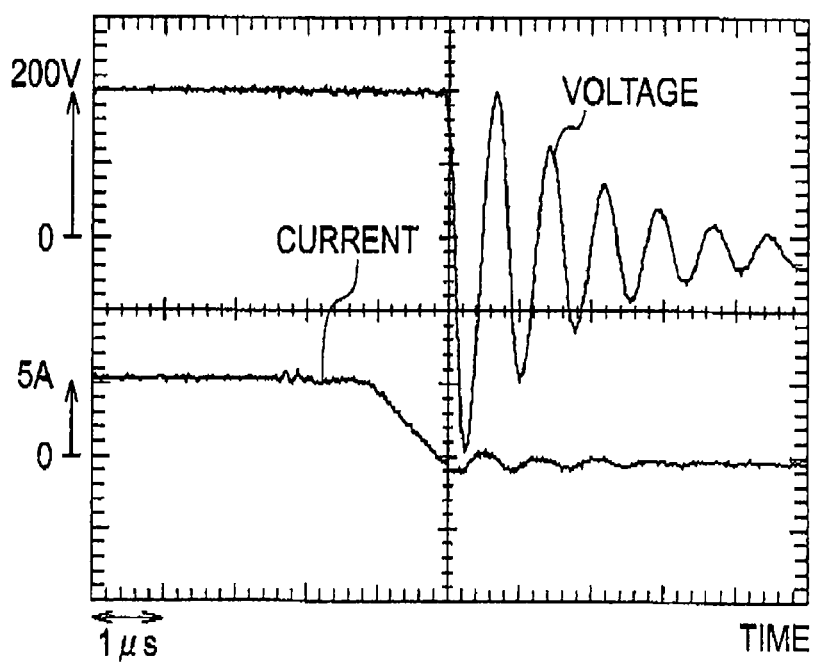
FIG. 5 is a diagram showing waveforms of the voltage and the current when a diode D1 of the DC-DC converter of Embodiment 1 is turned off.
Figure 6:
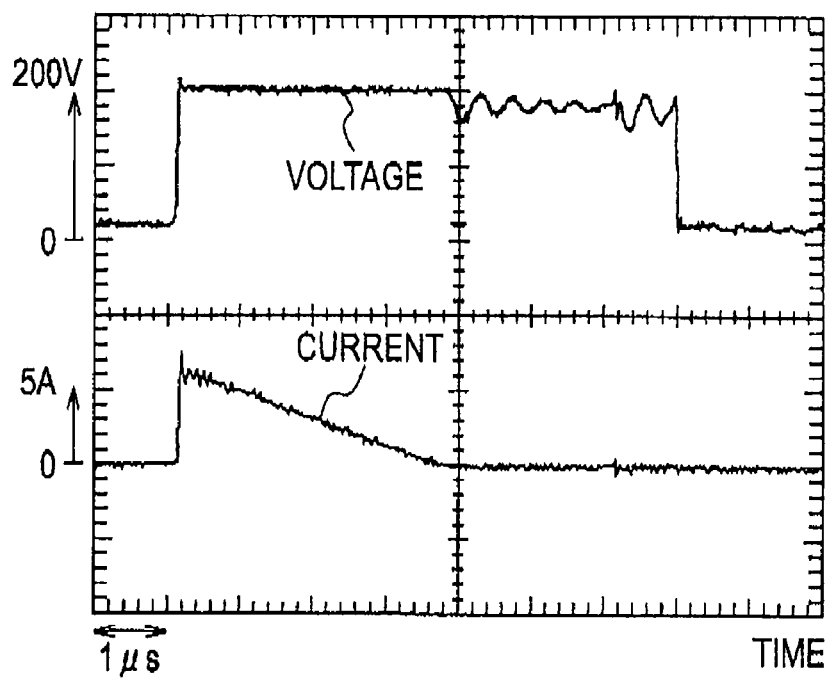
FIG. 6 is a diagram showing waveforms of the voltage and the current when a diode D2 of the DC-DC converter of Embodiment 1 is turned off.
Figure 7:
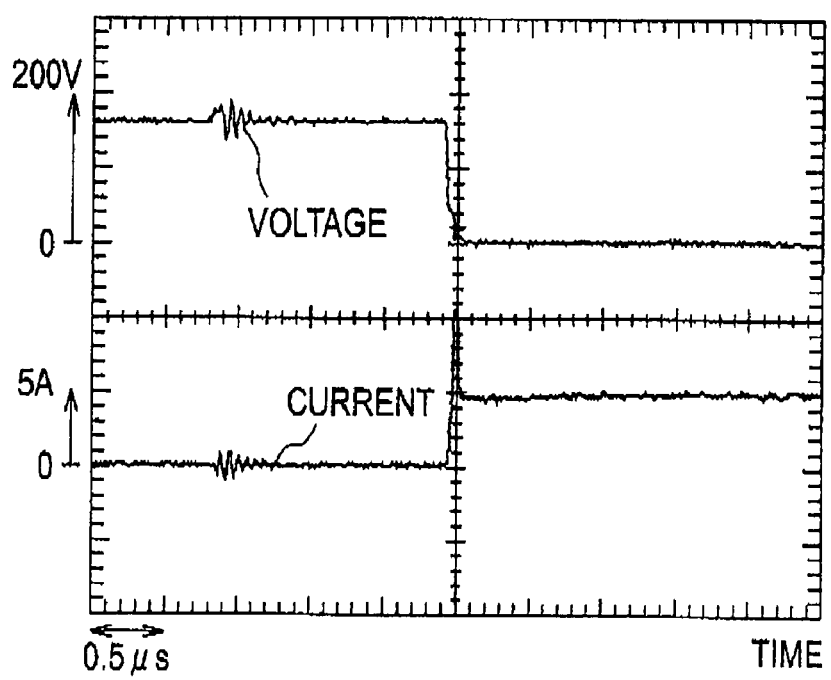
Figure 8:
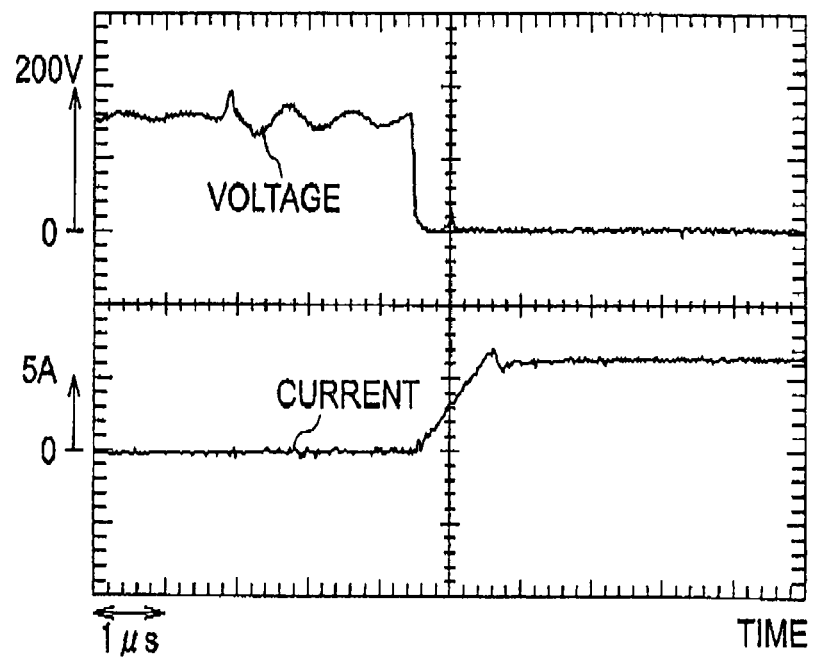

FIG. 4 is a diagram showing waveforms of the voltage and the current when the diode D3 of the conventional DC-DC converter is turned off. FIG. 5 is a diagram showing waveforms of the voltage and the current when the diode D1 of the DC-DC converter of Embodiment 1 is turned off. FIG. 6 is a diagram showing waveforms of the voltage and the current when the diode D2 of the DC-DC converter of Embodiment 1 is turned off. FIG. 7 is a diagram showing waveforms of the voltage and the current when a switch of the conventional DC-DC converter is turned on. FIG. 8 is a diagram showing waveforms of the voltage and the current when the switch of the DC-DC converter of Embodiment 1 is turned on.

In the conventional circuit of FIG. 4, the current rapidly decreases when the diode D3 is turned off. Therefore, a recovery phenomenon occurs, and a reverse current having a large peak is generated.

In contrast, in the circuit of Embodiment 1, the decrease of current is made moderate by the reactor Lr1 as shown in FIG. 5. Therefore, the peak of a reverse current due to recovery in the diode D1 is suppressed to be small.

In the circuit of Embodiment 1, as shown in FIG. 6, the current decreases moderately in the diode D2 in a similar manner when turned off. Therefore, a reverse current is hardly generated. Accordingly, in the circuit of Embodiment 1, it can be seen that recovery losses of the respective diodes D1 to D4 can be suppressed.

FIG. 7 is a diagram showing the waveforms of the voltage and the current when a switch Q1 of the conventional DC-DC converter is turned on.

FIG. 8 is a diagram showing waveforms of the voltage and the current when the switch Tr1 of the DC-DC converter of Embodiment 1 is turned on.

In the conventional circuit of FIG. 7, the current rises rapidly. Thus, an overlap of the current and the voltage is large and the switching loss of the switch Q1 is large.

In contrast, in the circuit of Embodiment 1 of FIG. 8, the current rises moderately. Thus, the overlap of the current and the voltage is small and the switching loss of the switch Tr1 is reduced. Accordingly, in the circuit of Embodiment 1, it can be seen that a zero-current turn-on soft switching operation can be achieved.

Figure 9:
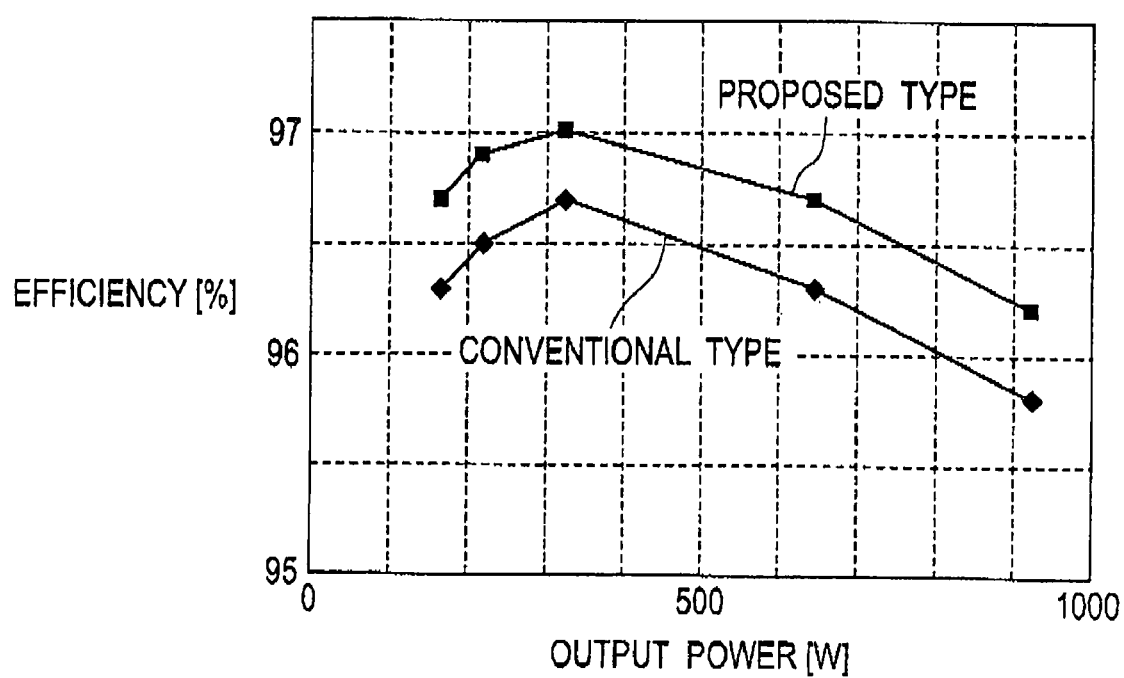
FIG. 9 is a diagram showing a comparison in efficiency between the conventional DC-DC converter and the DC-DC converter of Embodiment 1.

FIG. 9 is a diagram showing a comparison in efficiency of the conventional DC-DC converter and the DC-DC converter of Embodiment 1. In the circuit of Embodiment 1, the recovery loss of the diode and the switching loss of the switch at the time of turn-on are reduced. Thus, the efficiency is improved by 0.4% as a whole compared to the conventional circuit. Therefore, using the circuit of Embodiment 1 enables an electric power conversion with higher efficiency even when the switching frequency is increased. Thus, an electric power converter of small size, high efficiency, and high performance can be achieved by the increased switching frequency.

What is claimed is:

1. A DC-DC converter which increases a voltage of a direct current power supply, the DC-DC converter comprising:
a first switch connected to both ends of the direct current power supply via a primary winding of a first transformer;
a second switch connected to both ends of the direct current power supply via a primary winding of a second transformer;
a first series circuit which is connected to both ends of the first switch and which is formed of an additional winding of the first transformer connected to the primary winding of the first transformer in series, a first reactor, a first diode, and a smoothing capacitor;
a second diode connected to a connection point of the primary winding of the first transformer, the additional winding of the first transformer and the first switch, and to one end of the smoothing capacitor;
a second series circuit which is connected to both ends of the second switch and which is formed of an additional winding of the second transformer connected to the primary winding of the second transformer in series, a second reactor, a third diode, and the smoothing capacitor;
a fourth diode connected to a connection point of the primary winding of the second transformer, the additional winding of the second transformer and the second switch, and to the one end of the smoothing capacitor;
a third reactor connected to both ends of a series circuit in which a secondary winding of the first transformer and a secondary winding of the second transformer are connected in series; and
a control circuit which alternately turns on the first switch and the second switch every ½ cycle, turns off the first switch during an on-period of the second switch, and turns off the second switch during an on-period of the first switch.

* * * * *